(12) United States Patent
Kochura et al.

(10) Patent No.: US 10,891,330 B2
(45) Date of Patent: Jan. 12, 2021

(54) PROCESSING IMAGES FROM A GAZE TRACKING DEVICE TO PROVIDE LOCATION INFORMATION FOR TRACKED ENTITIES

(71) Applicant: International Business Machines Corporation, Armonk, NY (US)

(72) Inventors: Nadiya Kochura, Bolton, MA (US); Fang Lu, Billerica, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/662,028

(22) Filed: Oct. 24, 2019

(65) Prior Publication Data

US 2020/0057777 A1 Feb. 20, 2020

Related U.S. Application Data

(63) Continuation of application No. 15/345,390, filed on Nov. 7, 2016, now Pat. No. 10,528,614.

(51) Int. Cl.

| *G06K 9/00* | (2006.01) |
|---|---|
| *G06F 16/51* | (2019.01) |
| *G10L 25/51* | (2013.01) |
| *G06F 3/01* | (2006.01) |
| *G06T 7/20* | (2017.01) |
| *G10L 15/26* | (2006.01) |

(52) U.S. Cl.
CPC .............. *G06F 16/51* (2019.01); *G06F 3/013* (2013.01); *G06T 7/20* (2013.01); *G10L 15/26* (2013.01); *G10L 25/51* (2013.01)

(58) Field of Classification Search
None
See application file for complete search history.

(56) References Cited

U.S. PATENT DOCUMENTS

| 6,012,029 A | 1/2000 | Cirino et al. |
|---|---|---|
| 6,437,758 B1 | 8/2002 | Nielsen et al. |

(Continued)

FOREIGN PATENT DOCUMENTS

| CN | 204129927 | 1/2015 |
|---|---|---|
| WO | 2015054326 | 4/2015 |
| WO | 2015054328 | 4/2015 |

OTHER PUBLICATIONS

Machine Translation for CN204129927, published Jan. 28, 2015, Total 2 pages.

(Continued)

*Primary Examiner* — Wei Wen Yang
(74) *Attorney, Agent, or Firm* — David W. Victor; Konrad, Raynes, Davda and Victor LLP (57) ABSTRACT

Provided are a computer program product, system, and method for processing images from a gaze tracking device to provide location information for tracked entities. A gazed image is received from a gaze tracking device at which the user is gazing while operating the gaze tracking device. User speech is received from a microphone. The user speech is as having memorization intent. A description of a tracked entity that is an object of the memorization intent is extracted from the user speech. A tracking object in a tracking object database is created including the gazed image and the extracted description of the tracked entity for which the user has memorization intent. A determination is made of a location of the tracked entity and the determined location of the tracked entity is associated with the created tracking object in the tracking object database.

20 Claims, 6 Drawing Sheets

(56) References Cited

U.S. PATENT DOCUMENTS

| | | | |
|---|---|---|---|
| 8,494,215 | B2 | 7/2013 | Kimchi et al. |
| 8,510,166 | B2 | 8/2013 | Neven |
| 9,105,025 | B2 | 8/2015 | Poole et al. |
| 9,336,772 | B1 | 5/2016 | Salvador et al. |
| 2005/0256720 | A1 | 11/2005 | Iorio et al. |
| 2013/0083003 | A1* | 4/2013 | Perez .................. G06F 3/005 345/419 |
| 2013/0117204 | A1 | 5/2013 | Vadlamani et al. |
| 2014/0201126 | A1 | 7/2014 | Zadeh et al. |
| 2016/0154792 | A1 | 6/2016 | Saraikaya et al. |
| 2016/0373570 | A1 | 12/2016 | Scavezze et al. |
| 2017/0323158 | A1 | 11/2017 | Gordon |
| 2018/0018944 | A1* | 1/2018 | Venkitaraman ........ G09G 5/377 |

OTHER PUBLICATIONS

US Patent Application, dated Nov. 7, 2016, for U.S. Appl. No. 15/345,390, filed Nov. 7, 2016, invented by Nadiya Kochura et al., Total 33 pages.

Office Action, dated May 17, 2018, for U.S. Appl. No. 15/345,390, filed Nov. 7, 2016, invented by Nadiya Kochura et al., Total 36 pages.

Response to Office Action, dated Aug. 17, 2018, for U.S. Appl. No. 15/345,390, filed Nov. 7, 2016, invented by Nadiya Kochura et al., Total 15 pages.

Final Office Action, dated Dec. 10, 2018, for U.S. Appl. No. 15/345,390, filed Nov. 7, 2016, invented by Nadiya Kochura et al., Total 38 pages.

Response to Final Office Action, dated Mar. 11, 2019, for U.S. Appl. No. 15/345,390, filed Nov. 7, 2016, invented by Nadiya Kochura et al., Total 17 pages Office Action, dated Mar. 21, 2019, for U.S. Appl. No. 15/345,390, filed Nov. 7, 2016, invented by Nadiya Kochura et al., Total 43 pages.

Response to Office Action, dated Jun. 21, 2019, for U.S. Appl. No. 15/345,390, filed Nov. 7, 2016, invented by Nadiya Kochura et al., Total 18 pages.

Notice of Allowance, dated Aug. 28, 2019, for U.S. Appl. No. 15/345,390, filed Nov. 7, 2016, invented by Nadiya Kochura et al., Total 9 pages.

List of Patents and Applications Treated as Related, dated Oct. 22, 2019, Total 2 pages.

* cited by examiner

FIG. 1

FIG. 2 — Image Store Entry

FIG. 3 — Tracking Object

FIG. 4 — Location Object

FIG. 5 — Location History Entry

FIG. 6 — Trigger Alert

PROCESSING IMAGES FROM A GAZE TRACKING DEVICE TO PROVIDE LOCATION INFORMATION FOR TRACKED ENTITIES

BACKGROUND OF THE INVENTION

1. Field of the Invention

The present invention relates to a computer program product, system, and method for processing images from a gaze tracking device to provide location information for tracked entities.

2. Description of the Related Art

Current gaze tracking devices are typically worn as glasses and include cameras on the glasses to acquire gazed images being gazed by the eyes of the user. The gaze tracking device includes a camera to capture and analyze an eye image to determine the pupil location to acquire the gazed image the user eyes are staring at or tracking, i.e., gazing at directly. The gaze tracking device includes another camera to capture the scenes viewed by the user wearing the gaze tracking device, and the gazed image may comprise a localized region within the captured scene image.

There is a need in the art for developing applications for gaze tracking devices that will improve the lives of the users and assist with everyday living.

SUMMARY

Provided are a computer program product, system, and method for processing images from a gaze tracking device to provide location information for tracked entities. A gazed image is received from a gaze tracking device at which the user is gazing while operating the gaze tracking device. User speech is received from a microphone. The user speech is as having memorization intent. A description of a tracked entity that is an object of the memorization intent is extracted from the user speech. A tracking object in a tracking object database is created including the gazed image and the extracted description of the tracked entity for which the user has memorization intent. A determination is made of a location of the tracked entity and the determined location of the tracked entity is associated with the created tracking object in the tracking object database.

DETAILED DESCRIPTION

Memory loss is a serious problem that affects the lives of many people, and worsens as people age. Memory loss can be debilitating and prevent people from properly functioning in social and employment settings, disrupting work, hobbies, social activities, and family relationships. Memory loss and the inability to find objects can lead to depression and even result in life threatening situations.

Described embodiments provide techniques for automatically gathering information on tracked entities, comprising items or objects, a user has expressed an intent to memorize and the location of the tracked entities. Described embodiments utilize a gaze tracking device and a personal computing device to acquire a gazed image at which the user is gazing and classify speech received through a microphone of the personal computing device as having memorization intent. For user speech classified with memorization intent with respect to the gazed image, a tracking object is created to include the gazed image and an extracted description from the user speech of the tracked entity the gazed image represents. A determined location of the tracked entity of the gazed image may then be associated with the tracking object to allow tracking of the tracked entity to assist the user in memorizing and determining the location of the tracked entity.

Figure 1:
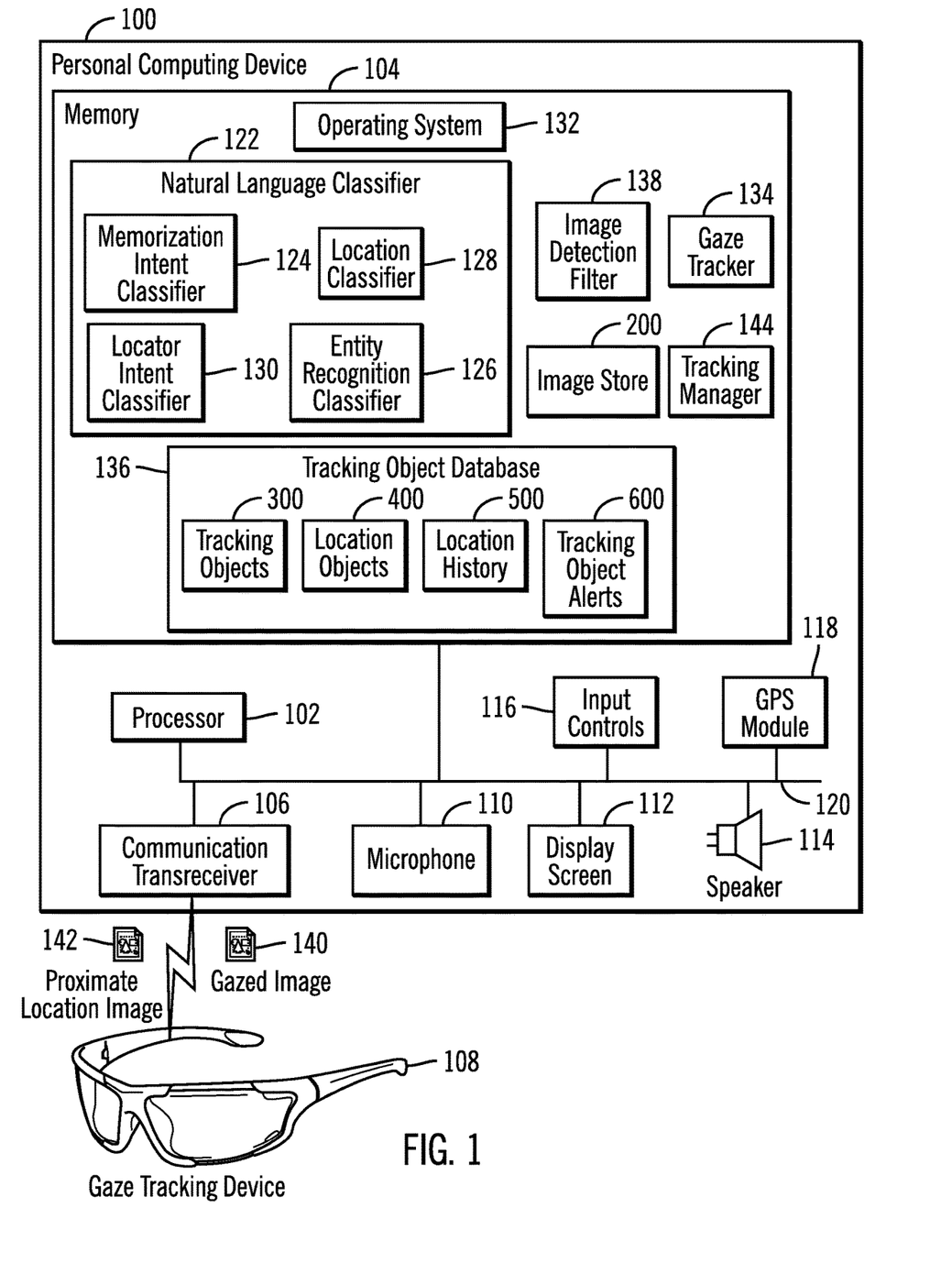
FIG. 1 illustrates an embodiment of a personal computing device interfacing with a gaze tracking device.

FIG. 1 illustrates an embodiment of a personal computing device 100 configured for use to assist a user in determining a location of items or objects. The personal computing device 100 includes a processor 102, a main memory 104, a communication transceiver 106 to communicate (via wireless communication or a wired connection) with external devices, including a wearable gaze tracking device 108; a microphone 110 to receive as input sound external to the personal computing device 100; a display screen 112 to render display output to a user of the personal computing device 100; a speaker 114 to generate sound output to the user; input controls 116 such as buttons and other software or mechanical buttons, including a keyboard, to receive user input; and a global positioning system (GPS) module 118 to determine a GPS potions of the personal computing device. The components 102-118 may communicate over one or more bus interfaces 120.

The main memory 104 may include various program components including a natural language classifier 122 having a memorization intent classifier 124 to classify user received speech via the microphone 110 as having a memorization intent to memorize a location of a tracked entity; an entity recognition classifier 126 to classify in user received speech an entity that is the object of the memorization intent; a location classifier 128 to classify in user received speech a location of the object subject to memorization intent or a placement movement detected by the gaze tracking device 108; and a locator intent classifier 130 to classify user speech as a locator request to locate a tracked entity. The classifiers 124, 128, 128, 130 may use stemming and other language analysis techniques to classify and interpret the intent behind text of the user speech and return a corresponding classification with associated confidence levels. The classifiers may utilize language classification algorithms, such as the International Business Machines (IBM) Watson™ Natural Language Classifier. (IBM and Watson are trademarks of International Business Machines Corporation throughout the world).

The main memory 104 may further include an operating system 132 to manage the personal computing device 100 operations and interface with device components 102-120; a gaze tracker 134 to interface with the gaze tracking device 108 to receive a gazed image 140 detected by eye tracking cameras that acquire the gazed image 140 on which the tracked eye is fixed and proximate location images 142 within the field of vision captured by the gaze tracking device 108 cameras that are proximate to the gazed image the eye is tracking; a tracking object database 136 having information on tracked entities the user has expressed an intent to memorize and the location of the tracked entities; an image store 200 including images, such as stock images; and an image detection filter 138, utilizing algorithms for matching and recognizing images, to determine whether gazed and proximate location images from the gaze tracking device 108 match images in the tracking object database 136 and the image store 200. The tracking object database 136 may be implemented as a relational database, an object oriented database, and other types of databases.

A tracking manager 144 in the main memory 104 may manage the tracking related operations, such as managing the objects in the tracking object database 136 and managing the execution of other programs such as the natural language classifiers 122, image detection filter 138, and gaze tracker 134 to track entity location for the user.

The tracking object database 136 may include tracking objects 300, such as records or object oriented objects, having information on each tracked entity with which the user of the personal computing device 100 has expressed an intent to memorize; location objects 400, such as records or object oriented objections, having information on identified proximate location entities proximate to a tracked entity; a location history 500 providing associations of tracked objects and location objects to indicate locations at which a tracked entity was located; and tracking object alerts 600 having definitions of alerts to generate based on detected tracked entities and proximate location entities.

The personal computing device may comprise a smart phone, personal digital assistance (PDA), or stationary computing device capable of processing user information observed through the gaze tracking device 108. The memory 104 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

The bus 120 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Generally, program modules, such as the program components 122, 124, 126, 128, 130, 132, 134, 138, 144 may comprise routines, programs, objects, components, logic, data structures, and so on that perform particular tasks or implement particular abstract data types. The program modules may be practiced in distributed cloud computing environments where tasks are performed by remote processing devices that are linked through a communications network. In a distributed cloud computing environment, program modules may be located in both local and remote computer system storage media including memory storage devices.

The program components and hardware devices of the personal computing device 100 of FIG. 1 may be implemented in one or more computer systems, where if they are implemented in multiple computer systems, then the computer systems may communicate over a network.

The program components 122, 124, 126, 128, 130, 132, 134, 138, 144 may be accessed by the processor 102 from the memory 104 to execute. Alternatively, some or all of the program components 122, 124, 126, 128, 130, 132, 134, 138, 144 may be implemented in separate hardware devices, such as Application Specific Integrated Circuit (ASIC) hardware devices.

The functions described as performed by the program components 122, 124, 126, 128, 130, 132, 134, 138, 144 may be implemented as program code in fewer program modules than shown or implemented as program code throughout a greater number of program modules than shown.

In alternative embodiments, the components of the personal computing device 100 may be embedded in the gaze tracking device 108.

Figure 2:
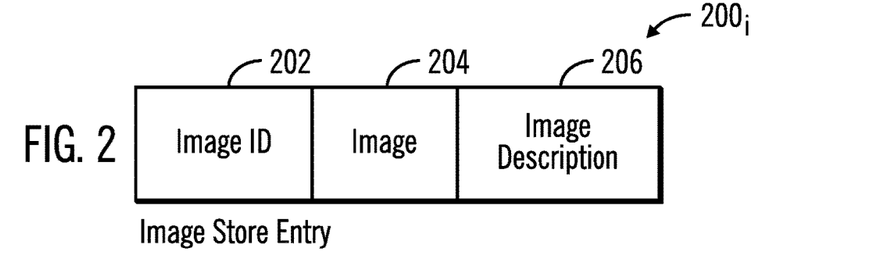
FIG. 2 illustrates an embodiment of an image store entry.

FIG. 2 illustrates an embodiment of an image entry $200_i$ in the image store 200 including an image identifier (ID) 202; an image 204, such as a graphics file representing a still image or motion picture; and a text description 206 of the image 204.

Figure 3:
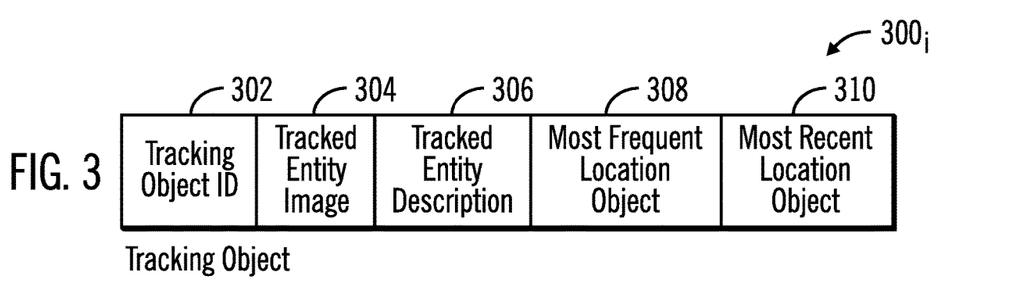
FIG. 3 illustrates an embodiment of a tracking object to track a location of a tracked entity.

FIG. 3 illustrates an embodiment of an instance of a tracking object $300_i$ of the tracking objects 300 including a tracking object identifier (ID) 302; a tracked entity image 304, such as a graphics file representing a still image or motion picture, which may comprise the gazed image 140 acquired by the gaze tracking device 108; a tracked entity description 306 comprising a textual description of the image 304; a most frequent location object 308 comprising a location object $400_i$ in a maximum number of entries for the tracking object 302 in the location history entries 500; and a most recent location object 310 comprising the location object $400_i$ identifying a location at which the tracked entity of the associated tracking object 302 was last located.

Figure 4:
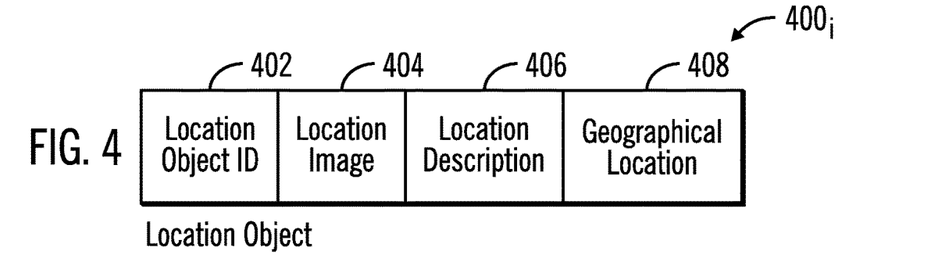
FIG. 4 illustrates an embodiment of a location object providing information on a location of a proximate location entity.

FIG. 4 illustrates an embodiment of a location object $400_i$ of the location objects 400 as including a location object ID 402; a location image 404, such as a graphics file representing a still image or motion picture of a location proximate image; a location description 406 comprising a textual description of the location image 404; and a geographical location 408 of the proximate location entity, such as a GPS location from the GPS module 118.

Figure 5:
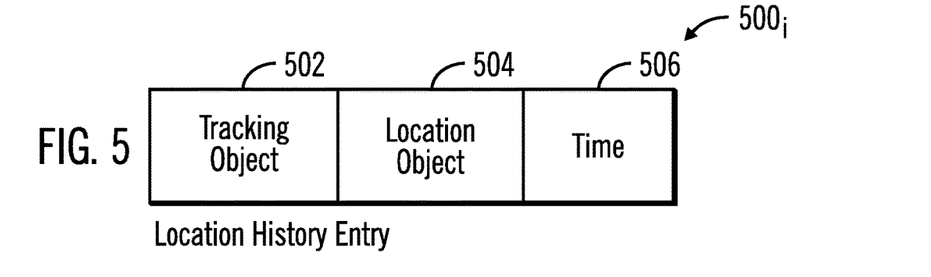
FIG. 5 illustrates an embodiment of a location history entry.

FIG. 5 illustrates an embodiment of a location history entry $500_i$ in the location history 500 as including a tracking object 502 identifying a tracked entity and an associated location object 504 identifying a proximate location entity at the location of the tracked entity, and a time 506 at which the tracked entity and the proximate location entity were detected by the gaze tracking device 108.

Figure 6:
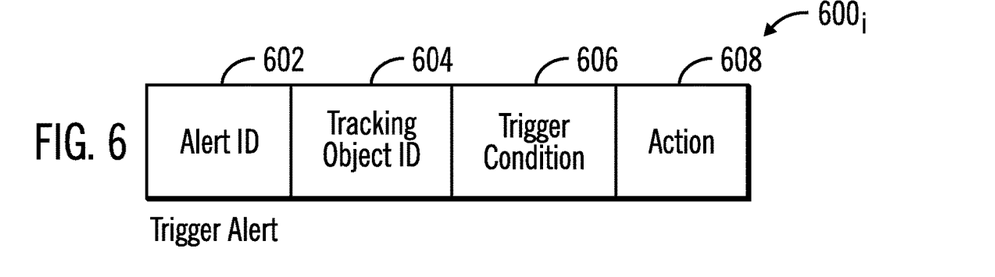
FIG. 6 illustrates an embodiment of a trigger alert for a tracked entity.

FIG. 6 illustrates an embodiment of a trigger alert instance $600_i$ in the trigger alerts 600 including an alert ID 602; a tracking object ID 604 of a tracking object subject to the alert 602; a trigger condition 606 comprising a condition with respect to the tracked entity represented by the tracking object 604 and/or a proximate location entity represented by the most recent location object 310, such that satisfaction of the condition 606 causes a specified action 608 to be performed.

For instance, detecting a tracked entity with respect to a specified proximate location entity at a specified time may trigger a warning or alert. An alert may be triggered when a tracked entity, represented by tracking object 604, such as a key, is located with respect to a forbidden proximate location entity, such as a lock, door, etc. Another example is when the tracked entity comprises a prohibited access item, such as a medicine, drugs, food, television, refrigerator, etc., that is detected as the object of a placement movement at a specified time at which use of those tracked entities by the user is prohibited. The alert 608 may remind the user of the potential prohibited action or notify a person or organization monitoring the user of the personal computing device 100 and gaze tracking device 108 for prohibited access to tracked entities. Other conditions 606 may specify that the prohibition is triggered when a certain prohibited proximate location entity is detected with the tracked entity.

The data structures in FIGS. 2-6 show various fields of information. In alternative embodiments, different fields of information may be provided than that described, such as additional fields of information, or certain described fields of information may not be included.

Figure 7A:
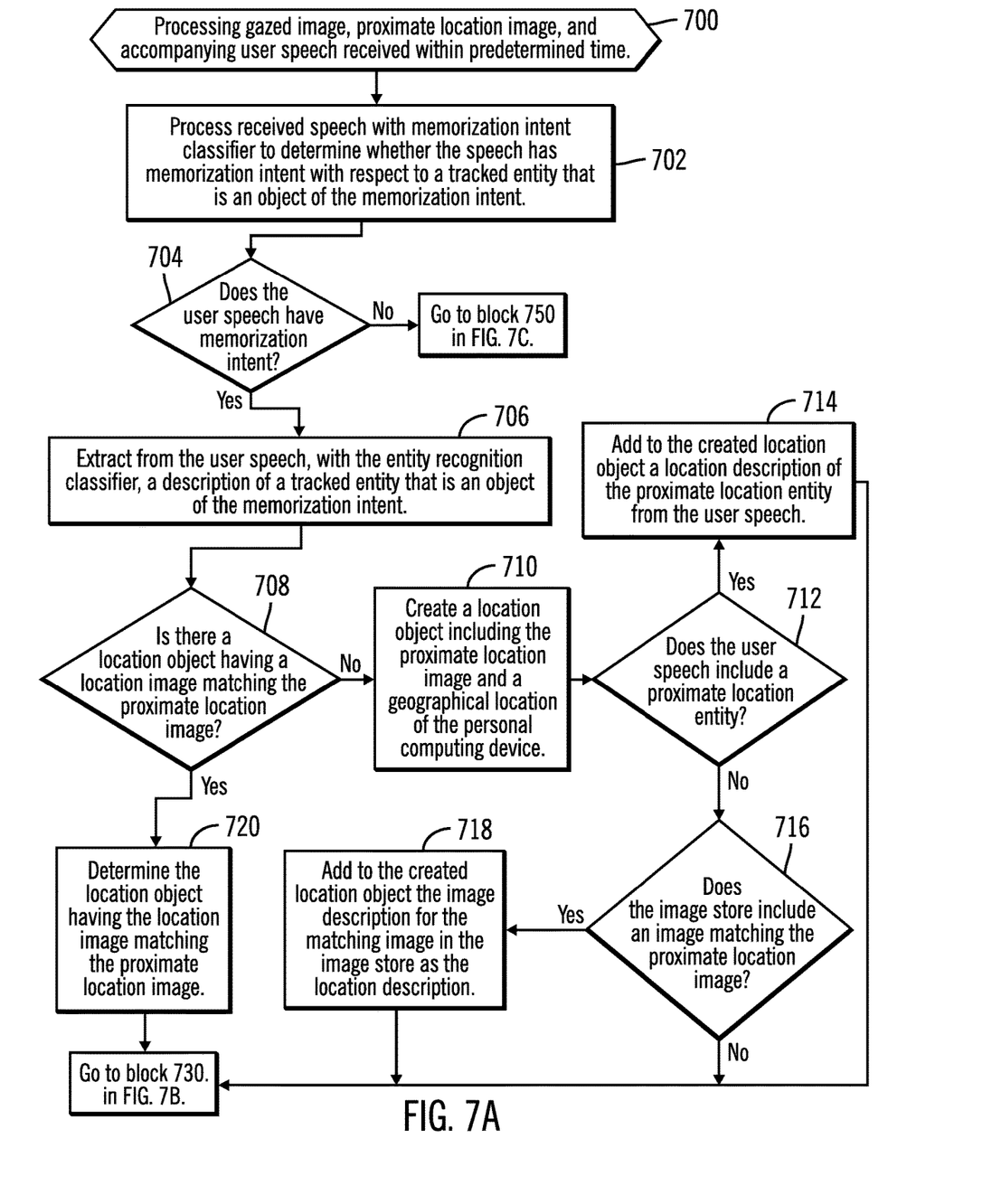
FIGS. 7*a*, 7*b*, and 7*c* illustrate an embodiment of operations to process user speech to determine intent with respect to a gazed image and proximate location image received from a gaze tracking device.
Figure 7B:
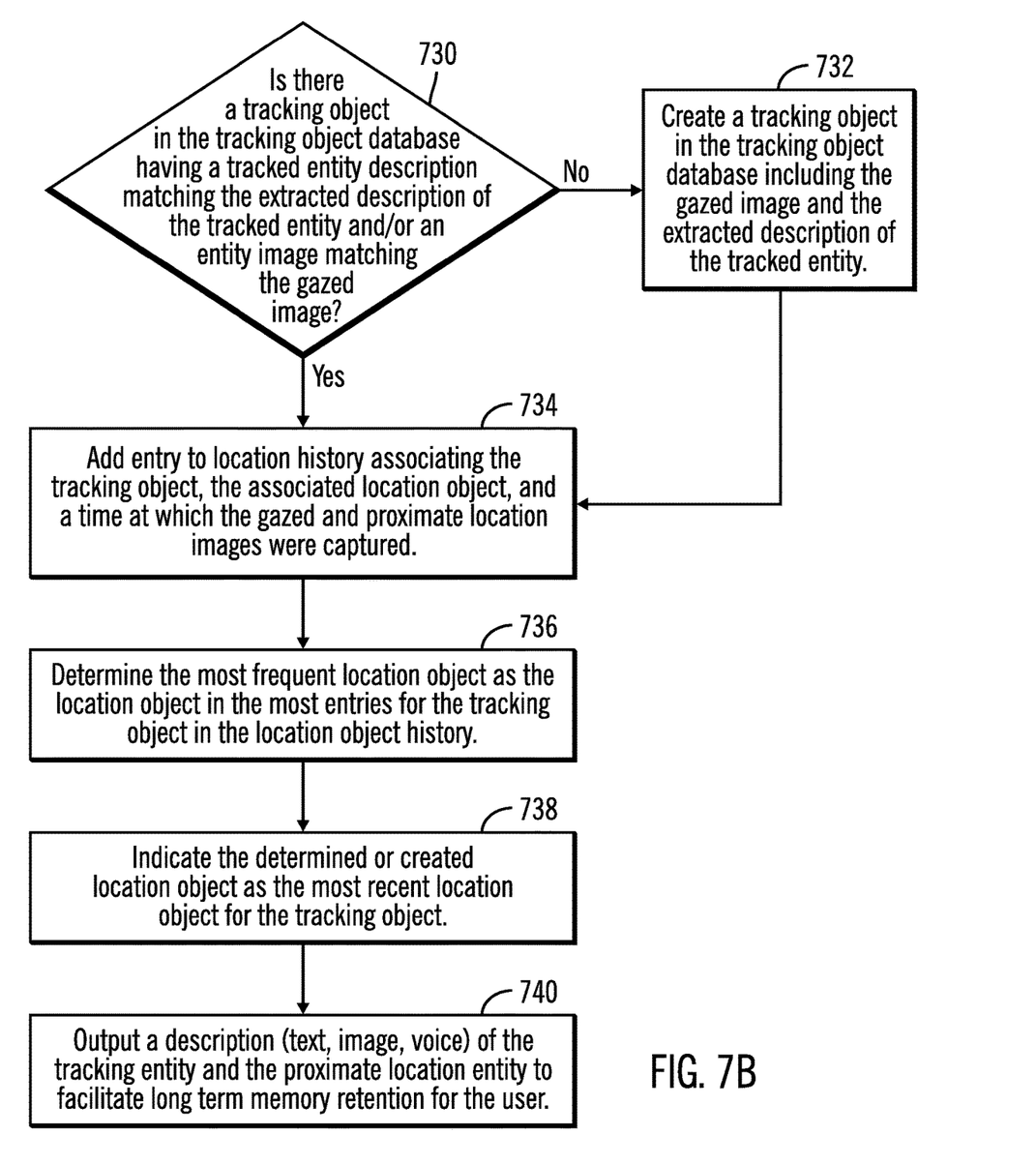
Figure 7C:
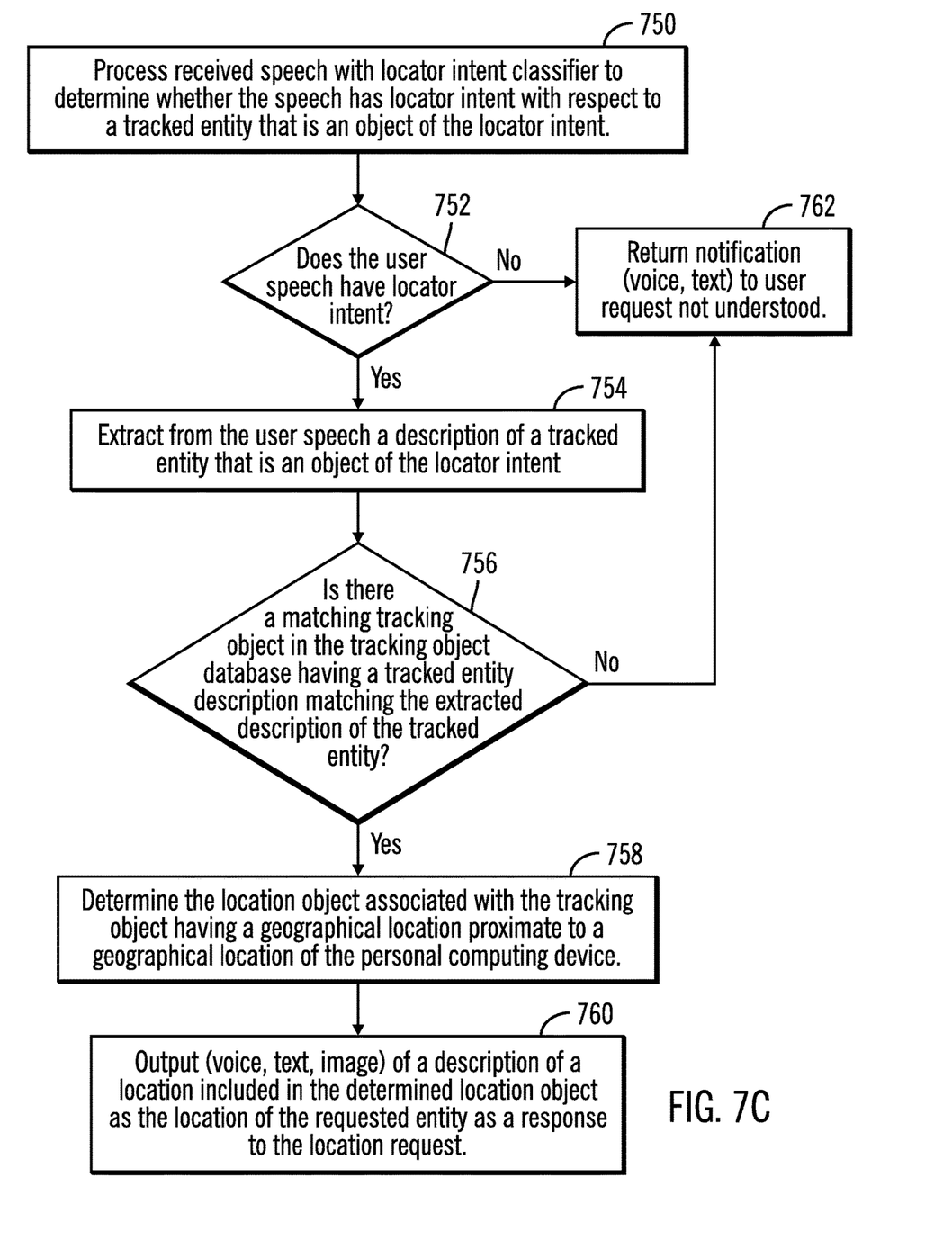

FIGS. 7a, 7b, and 7c illustrate an embodiment of operations performed by the program components, such as the natural language classifiers 122-130, gaze tracker 134, and image detection filter 138 to process user speech input via the microphone 110 received concurrently with gazed images 140 and proximate location images 142 received from the gaze tracking device 108. Control begins upon the gaze tracker 134 processing (at block 700) a gazed image 140 and proximate location image 142 received from the gaze tracking device 108 concurrently with accompanying user speech received at the microphone 110 within a predetermined time indicating substantially concurrent receipt. The gaze tracking device 108 or gaze tracker 134 may determine the gazed image 140 as a portion of an image recorded by the cameras of the gaze tracking device that is being gazed upon by the eyes of the user, which may be tracked by eye cameras of the gaze tracking device 108. The gaze tracking device 108 or gaze tracker 134 may further determine the proximate location image 142 as a portion of the image recorded by the cameras that comprises a proximate location image of an entity or item located proximate with respect to the item comprising the gazed image 140. There may be one or more proximate location images 142 discerned from the recorded image.

In one embodiment, the gazed image 140 may comprise a tracking entity the user wants to memorize, such as car or house keys, television remote, smartphone, medication, etc., and the proximate location image 142 may comprise an item or entity proximate to the location of the gazed image 140 to track that is within the view captured by the gaze tracking device 108, such as a table top, desk, drawer, medicine cabinet or any other item that assists in identifying the proximate location of the gazed image 140 comprising a tracked entity to track.

The received user speech may be converted into text in order for the natural language classifier 122 components to perform the language classification analysis on the text of the user speech. The memorization intent classifier 124 processes (at block 702) the received user speech to determine whether the speech has memorization intent with respect to a tracked entity that is an object of the memorization intent. If (at block 704) the user speech is classified as having memorization intent, which is a desire by the user of the personal computing device 100 and gaze tracking device 108 to track an entity or item, then the entity recognition classifier 126 extracts (at block 706) from the received user speech a description of a tracked entity that is an object of the memorization intent.

If (at block 708) the image detection filter 138 determines that there is no location object $400_i$ having a location image 404 matching the received proximate location image 142, then the tacking manager 144 creates (at block 710) a location object $400_C$ including the proximate location image 142 as the location image 402 and a geographical location 408 of the personal computing device as determined by the GPS module 118. If (at block 712) the location classifier 128 determines that the user speech is classified to include a proximate location entity, then the tracking manager 144 adds (at block 714) to the created location object $400_C$ a location description 406 of the proximate location entity extracted from the user speech. If (at block 712) the user speech is not classified to include a proximate location entity, then the image detection filter 138 determines (at block 716) whether the image store 200 includes an image entry $200_i$ with an image 204 matching the proximate location image 142. If the image store 200 has the matching image, then the tracking manager 144 adds (at block 718) to the created location object $400_C$ the image description 206 as the location description 406.

If (at block 708) there is an existing a location object $400_i$ in the location objects 400, then the tracking manager 144 determines (at block 720) the location object $400_i$ having the location image 404 matching the proximate location image 142. After determining an existing or created location object at blocks 714, 716, 718 or 720, control proceeds to block 730 in FIG. 7b.

At block 730, the tracking manager 144 determines whether there is a tracking object $300_i$ in the tracking object database 136 having a tracked entity description 306 matching the extracted description of the tracked entity from the user speech and/or tracked entity image 304 matching the gazed image 140. If (at block 730) there is no existing tracking object $300_i$ for the gazed image 140, then the tracking manager 144 creates (at block 732) a tracking object $300_C$ in the tracking object database 136 including the gazed image 140 and the extracted description of the tracked entity as the tracked entity image 304 and the tracked entity description 306, respectively. After creating a tracking object $300_C$ (from block 732) or if there is already a matching tracking object $300_i$ for the gazed image 140 (from the yes branch of block 730), the tracking manager 144 adds (at block 734) an entry $500_i$ to the location history 500 associating the determined/created tracking object $300_i$ as tracking object 502 and the determined/created location object $400_i$ as location object 504, and a time 506 at which the gazed image 140 and proximate location image 142 were captured by the gaze tracking device 108.

The tracking manager 144 may determine (at block 736) the most frequent location object 308 as the location object $400_i$ in the maximum number of entries 500, for the determined/created tracking object $300_i$ in the location history 500. The determined or created location object 400$_i$ may be indicated (at block 738) as the most recent location object 310 for the tracking object. The tracking manager 144 may then output to the user (at block 740) a description in text, image or voice format of the tracking entity and the proximate location entity to facilitate long term memory retention for the user of the location of the tracking entity, or gazed image 140. Text and images may be outputted to the display screen 112 or transmitted via text or message and voice may be outputted through the speaker 114.

If (at block 704) in FIG. 7a the user speech is not classified has having memorization intent, then control proceeds to block 750 in FIG. 7c. At block 750, the locator intent classifier 130 processes and classifies the received user speech to determine whether the speech has locator intent with respect to a tracked entity that is an object of the locator intent. If so (at block 752), then the entity recognition classifier 126 extracts (at block 754) from the user speech a description of a tracked entity that is an object of the locator intent, i.e., something the user wants to locate. If (at block 756) there is a matching tracking object 300$_i$ in the tracking object database 136 having a tracked entity description 306 matching the extracted description of the tracked entity, then the tracking manager 144 determines (at block 758) the location object 400$_i$ associated with the determined tracking object 300$_i$ having a geographical location 408 proximate to a geographical location of the personal computing device 100 as determined through the GPS module 118. The determined location object 400$_i$ may comprise the location object 504 in a location history entry 500$_i$ having a most current time 506 that has a geographical location 408 proximate to the user's current GPS location, where proximate means within a predefined distance. The tracking manager 144 may then output to the user (at block 760) a description in text, image or voice format of a location description 406 of a location included in the determined location object 400$_i$ as the location of the requested entity as a response to the location request determined by the locator intent classifier 130. Text and images may be outputted to the display screen 112 or transmitted via text or message, and voice may be outputted through the speaker 114.

If (at block 752) the user speech does not have locator intent, then the tracking manager 144 returns (at block 762) a notification via voice or text to the user that the request was not understood and to retry.

The described operations of FIGS. 7a, 7b, and 7c provide database related operations to determine whether received user speech can be classified as having memorization intent or locator intent to determine actions to take with respect to the database 136, such as adding tracking objects, location objects, location history entries, and outputting memorization intent or a location of a requested tracking entity to facilitate memory retention of the location of an object or entity of interest to the user.

Figure 8:
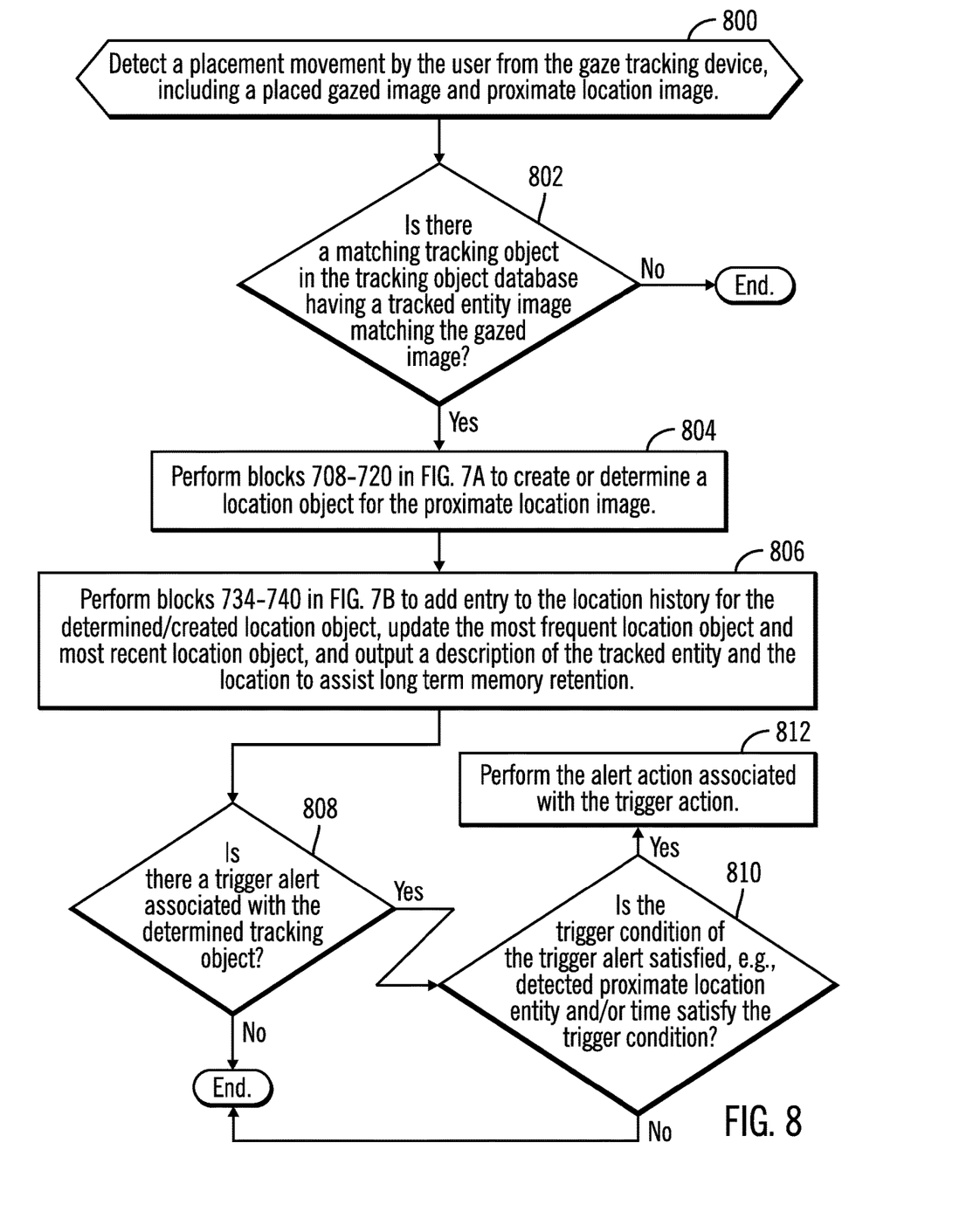
FIG. 8 illustrates an embodiment of operations to process a detected placement movement from the gaze tracking device.

FIG. 8 illustrates an embodiment of operations performed by the personal computing device 100 components to process a detected placement movement from the gaze tracking device 108 with respect to a tracked entity identified by one of the tracking objects 300$_i$ in the tracking object database 136. Upon the gaze tracker 134 detecting (at block 800) a placement movement by the user from the gaze tracking device 108 including a placed gazed image 140 and proximate location image 142, the tracking manager 144 determines (at block 802) whether there is a matching tracking object 300$_i$ in the tracking object database 136 having a tracked entity image 304 matching the placed gazed image 140. If so, then the operations at blocks 708-720 in FIG. 7a are performed to create or determine a location object 400$_i$ for the proximate location image 142. The tracking manager 144, and/or other components, performs (at block 806) the operations at blocks 734-740 in FIG. 7b to add an entry 500$_i$ to the location history 500 for the determined/created location object 400$_i$, updates the most frequent location object 308 and most recent location object 310, and outputs to the user a description of the tracked entity and the location of the tracked entity to facilitate long term memory retention.

If (at block 808) there is a trigger alert 600$_i$ associated with the determined tracking object 300$_i$, such as the trigger alert 600$_i$ including the determined tracking object 300$_i$ in field 604, then the tracking manager 144 determines (at block 810) whether a trigger condition 606 of the trigger alert 600$_i$, is satisfied. The trigger condition 606 may specify prohibited access of the tracked entity, which may be defined as the detected proximate location entity as proximate with a prohibited proximate location in the condition 606, or a prohibited proximate location within a time range.

If (at block 810) the trigger condition is satisfied, then the alert action 608 is performed, which may involve notifying the user via the microphone, text or email, or voice of the nature of the triggered alert, or notifying a monitoring agent at remote location. If (at block 810) the trigger condition is not satisfied or if (at block 808) there is no trigger alert associated with the determined tracking object, then control ends.

If (at block 802) there is no matching tracking object, indicating that the gazed image does not comprise an entity or item the user is tracking for memorization purposes, then control ends.

With the operations of FIG. 8, the tracking object for a tracked entity subject to a detected placement movement may be updated with a new location object indicating a new location of the tracked entity to provide accurate location information. Further, the detected placement movement may be analyzed to determine whether any trigger conditions are satisfied indicating perhaps a prohibited action with respect to the placed tracked entity and its new location that warrants a trigger alert to the user or other monitoring agent.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing location information in communication with a gaze tracking device operated by a user, the computer program product comprising a computer readable storage medium having computer readable program code embodied therein that executes to perform operations, the operations comprising:
   generating a tracking database object in a database including a gazed image in a recorded image captured by the gaze tracking device and a location of the gazed image, wherein the recorded image further includes a proximate image located proximate to the gazed image in the recorded image;
   determining whether there is a preexisting location database object in the database having a location image matching the proximate image;
   creating a location database object in the database including a location image matching the proximate image in response to determining that there is no preexisting location database object in the database having the location image matching the proximate image;
   creating a location association entry in the database associating the tracking database object with one of the preexisting location database object, in response to determining there is the preexisting location database object, and the created location database object, in response to determining there is no preexisting location database object; and
   outputting a description of the location in the location database object associated by the location association entry with the tracking database object in response to a request to locate the gazed image in the tracking database object.

2. The computer program product of claim 1, wherein the operations further comprise:
   including a description of the gazed image in the tracking database object;
   receiving a location request for a requested entity with a description of the requested entity;
   determining a tracking database object for the requested entity in the database that has a description matching the description of the requested entity in the tracking database object; and
   determining a location database object in the database that is associated with the determined tracking database object in a location association entry, wherein the outputted description is from the determined location database object.

3. The computer program product of claim 1, wherein the operations further comprise:
   indicating, in each tracking database object of tracking database objects in the database, a most recent location database object comprising the location database object identifying the location at which the gazed image of the tracking database object was most recently located and a most frequent location database object comprising a location database object identifying a location at which the gazed image identified by the tracking database object is most frequently detected as being located, wherein the outputted description of the location includes a description of at least one location identified in at least one of the most recent location database object and the most frequent location database object.

4. The computer program product of claim 1, wherein location database objects include a geographical location of the location identified by the location database object, wherein the operations further comprise:
   determining a geographical location of a personal computing device in communication with the gaze tracking device, wherein the determining the location database object for the determined tracking database object comprises determining the location database object indicating a geographical location within a predetermined proximity to the determined geographical location of the personal computing device.

5. The computer program product of claim 1, wherein the operations further comprise:
   determining whether there is a matching tracking database object in the database having a description matching a description of the gazed image, wherein the generating the tracking database object is performed in response to determining that there is no matching tracking database object in the database.

6. The computer program product of claim 1, wherein the operations further comprise:
   detecting, from the gaze tracking device, a placement movement with respect to the user;
   receiving, from the gaze tracking device, a placed gazed image and a proximate image in response to the detected placement movement;
   determining a tracking database object in the database having an image matching the placed gaze image;
   determining a location database object in the database having a location image matching the proximate image for the placed gazed image;
   determining a description of the image in the determined tracking database object;
   determining a location description from the determined location database object; and
   outputting, to the user, the determined description of the image and the determined location description to assist the user to memorize the location of the placed gazed image identified by the determined tracking database object.

7. A system for providing location information for tracking entities implemented in communication with a gaze tracking device operated by a user, comprising:
   a processor;
   a computer readable storage medium having computer readable program code embodied therein that executes to perform operations, the operations comprising:

generating a tracking database object in a database including a gazed image in a recorded image captured by the gaze tracking device and a location of the gazed image, wherein the recorded image further includes a proximate image located proximate to the gazed image in the recorded image;

determining whether there is a preexisting location database object in the database having a location image matching the proximate image;

creating a location database object in the database including a location image matching the proximate image in response to determining that there is no preexisting location database object in the database having the location image matching the proximate image;

creating a location association entry in the database associating the tracking database object with one of the preexisting location database object, in response to determining there is the preexisting location database object, and the created location database object, in response to determining there is no preexisting location database object; and outputting a description of the location in the location database object associated by the location association entry with the tracking database object in response to a request to locate the gazed image in the tracking database object.

8. The system of claim 7, wherein the operations further comprise:
including a description of the gazed image in the tracking database object;
receiving a location request for a requested entity with a description of the requested entity;
determining a tracking database object for the requested entity in the database that has a description matching the description of the requested entity in the tracking database object; and
determining a location database object in the database that is associated with the determined tracking database object in a location association entry, wherein the outputted description is from the determined location database object.

9. The system of claim 7, wherein the operations further comprise:
indicating, in each tracking database object of tracking database objects in the database, a most recent location database object comprising the location database object identifying the location at which the gazed image of the tracking database object was most recently located and a most frequent location database object comprising a location database object identifying a location at which the gazed image identified by the tracking database object is most frequently detected as being located, wherein the outputted description of the location includes a description of at least one location identified in at least one of the most recent location database object and the most frequent location database object.

10. The system of claim 7, wherein location database objects include a geographical location of the location identified by the location database object, wherein the operations further comprise:
determining a geographical location of a personal computing device in communication with the gaze tracking device, wherein the determining the location database object for the determined tracking database object comprises determining the location database object indicating a geographical location within a predetermined proximity to the determined geographical location of the personal computing device.

11. The system of claim 7, wherein the operations further comprise:
determining whether there is a matching tracking database object in the database having a description matching a description of the gazed image, wherein the generating the tracking database object is performed in response to determining that there is no matching tracking database object in the database.

12. The system of claim 7, wherein the operations further comprise:
detecting, from the gaze tracking device, a placement movement with respect to the user;
receiving, from the gaze tracking device, a placed gazed image and a proximate image in response to the detected placement movement;
determining a tracking database object in the database having an image matching the placed gaze image;
determining a location database object in the database having a location image matching the proximate image for the placed gazed image;
determining a description of the image in the determined tracking database object;
determining a location description from the determined location database object; and
outputting, to the user, the determined description of the image and the determined location description to assist the user to memorize the location of the placed gazed image identified by the determined tracking database object.

13. A computer implemented method implemented in a computing device in communication with a gaze tracking device for providing location information for tracking entities comprising:
generating a tracking database object in a database including a gazed image in a recorded image captured by the gaze tracking device and a location of the gazed image, wherein the recorded image further includes a proximate image located proximate to the gazed image in the recorded image;
determining whether there is a preexisting location database object in the database having a location image matching the proximate image;
creating a location database object in the database including a location image matching the proximate image in response to determining that there is no preexisting location database object in the database having the location image matching the proximate image;
creating a location association entry in the database associating the tracking database object with one of the preexisting location database object, in response to determining there is the preexisting location database object, and the created location database object, in response to determining there is no preexisting location database object; and
outputting a description of the location in the location database object associated by the location association entry with the tracking database object in response to a request to locate the gazed image in the tracking database object.

14. The method of claim 13, further comprising:
including a description of the gazed image in the tracking database object;
receiving a location request for a requested entity with a description of the requested entity;

determining a tracking database object for the requested entity in the database that has a description matching the description of the requested entity in the tracking database object; and determining a location database object in the database that is associated with the determined tracking database object in a location association entry, wherein the outputted description is from the determined location database object.

15. The method of claim 13, further comprising:

indicating, in each tracking database object of tracking database objects in the database, a most recent location database object comprising the location database object identifying the location at which the gazed image of the tracking database object was most recently located and a most frequent location database object comprising a location database object identifying a location at which the gazed image identified by the tracking database object is most frequently detected as being located, wherein the outputted description of the location includes a description of at least one location identified in at least one of the most recent location database object and the most frequent location database object.

16. The method of claim 13, wherein location database objects include a geographical location of the location identified by the location database object, further comprising:

determining a geographical location of a personal computing device in communication with the gaze tracking device, wherein the determining the location database object for the determined tracking database object comprises determining the location database object indicating a geographical location within a predetermined proximity to the determined geographical location of the personal computing device.

17. The method of claim 13, further comprising:

determining whether there is a matching tracking database object in the database having a description matching a description of the gazed image, wherein the generating the tracking database object is performed in response to determining that there is no matching tracking database object in the database.

18. The computer program product of claim 1, wherein the operations further comprise:

including, in the location association entry, information on when the gazed image identified in the tracking database object and the proximate image identified in the location database object were detected by the gaze tracking device.

19. The system of claim 7, wherein the operations further comprise:

including, in the location association entry, information on when the gazed image identified in the tracking database object and the proximate image identified in the location database object were detected by the gaze tracking device.

20. The method of claim 13, further comprising:

including, in the location association entry, information on when the gazed image identified in the tracking database object and the proximate image identified in the location database object were detected by the gaze tracking device.

* * * * *